Jan. 19, 1960 R. I. N. WEINGART 2,921,515
MACHINES FOR ISSUING BUSINESS FORMS
Filed Feb. 14, 1956 10 Sheets-Sheet 5

INVENTOR.
RICHARD I. N. WEINGART

BY
*Busser, Smith & Hurley*
ATTORNEYS

Jan. 19, 1960   R. I. N. WEINGART   2,921,515
MACHINES FOR ISSUING BUSINESS FORMS
Filed Feb. 14, 1956   10 Sheets-Sheet 6

INVENTOR.
RICHARD I. N. WEINGART
BY
ATTORNEYS

Jan. 19, 1960     R. I. N. WEINGART     2,921,515

MACHINES FOR ISSUING BUSINESS FORMS

Filed Feb. 14, 1956     10 Sheets-Sheet 7

*INVENTOR.*
RICHARD I. N. WEINGART

BY

*ATTORNEYS*

Fig.12

Jan. 19, 1960  R. I. N. WEINGART  2,921,515
MACHINES FOR ISSUING BUSINESS FORMS
Filed Feb. 14, 1956  10 Sheets-Sheet 9

Fig. 14

INVENTOR.
RICHARD I. N. WEINGART

BY
ATTORNEYS

Jan. 19, 1960    R. I. N. WEINGART    2,921,515
MACHINES FOR ISSUING BUSINESS FORMS
Filed Feb. 14, 1956    10 Sheets-Sheet 10

INVENTOR.
RICHARD I. N. WEINGART
BY
ATTORNEYS

United States Patent Office 2,921,515
Patented Jan. 19, 1960

2,921,515
MACHINES FOR ISSUING BUSINESS FORMS

Richard I. N. Weingart, New York, N.Y., assignor to Burroughs Corporation, Detroit, Mich., a corporation of Michigan Application February 14, 1956, Serial No. 565,458

10 Claims. (Cl. 101—68)

This invention relates to machines and methods for issuing business forms and to forms or tickets issued by the machine and in accordance with said methods.

The general objects of the present invention relate to the issuance of business forms and particularly transportation tickets in such fashion as to avoid the necessity for carrying on hand stocks of preprinted tickets which, by virtue of their nature, represent documents of value, provide accounting records of the tickets issued from which all essential data may be secured, to insure against falsification of records, and to facilitate the issuance of tickets. In accordance with the invention, a mechanism for issuing tickets and maintaining records is provided which is relatively simple and inexpensive and, hence, is particularly adapted for use at stations, airports, relatively small ticket agencies, etc., where the number of sales of tickets made would not warrant the cost of more elaborate machines. However, as will become apparent hereafter, machines of the type herein disclosed are by no means so limited in their capabilities that they would be inapplicable even to stations, or the like, where large volume sales are involved. Furthermore, the machines are adapted to other than transportation use, though for consistency of description they will be hereafter referred to as for that use.

In brief, the machines of the present invention are arranged to print tickets from sheet stock, which may be in part preprinted, through the use of removable slugs corresponding to particular tickets to be issued. These slugs not only print suitable matters on the ticket strip to form the tickets to be issued, but additionally provide complete printed records of the transactions involved. Furthermore, the machine is arranged to issue, and record the issuance of, tickets of "write-in" type to which certain information must be written in the ticket by the ticket-issuing agent. Such tickets may be involved, for example, when it does not pay to provide at the station of issuance slugs involving the issuance of tickets to small stations or destinations to which the traffic from the issuing station may be quantitatively very low. Write-in operation may also be involved in the case of issuance of pullman or coach reservation tickets, in which instances the ticket issuing agent may be required to ascertain space available and identify on the ticket the particular space sold.

In my application Serial Number 475,940, filed December 17, 1954, there is described a machine conforming with the brief description above made and capable of attaining the general objects already stated. In accordance with the present invention, the machine of said prior application is improved in various respects for the securing of advantageous results as follows:

Smaller tickets may be satisfactorily printed and, furthermore, limitations are not imposed on the ticket stock used, so that relatively thick books of tickets may be printed, and tickets may be provided from heavy stock such as cardboard or the like. Nevertheless, journal entries may be provided together with vouchers, if desired. In brief, this end is achieved by locating a journal sheet, or a plurality of journal sheets, between a printing slug and the ticket being printed. Furthermore, provision may be made for printing a voucher containing the journal entries without printing such entries on the ticket. Various advantages are secured in connection with the foregoing and also for other reasons by having a ticket or voucher strip feed at right angles to the direction of advance of one or more journal strips. In the issuance of ordinary tickets there is avoidance of the possibility of fraud due to the fact that the ticket at the time the printing operation takes place is inaccessible to the operator of the machine so that printing on the ticket cannot be prevented by, for example, the insertion of a blank sheet of paper to take the printed impression, with subsequent delineation on the ticket of a fraudulent destination or the like.

The attainment of these and other objects will become apparent from the following description, read in conjunction with the accompanying drawings, in which.

The machine specifically disclosed in the present application is a modification of the machine shown in my prior application referred to above, and accordingly the present disclosure need not include all of the details, particularly relating to controls, disclosed in said prior application. The disclosure is primarily directed to the differences between the new machine and the machine of said prior application, and to facilitate an understanding of the relationships between the two machines there have been applied to the present mechanism, where applicable, the same reference numerals as have been applied to the prior machine. The mechanism will be first described and there will then be described the types of tickets which may be issued and the various alternative ticket issuing methods which may be employed in accordance with the invention.

The machine comprises a housing which incorporates various supporting frame elements, the arrangement of which will become clear as the description proceeds without the necessity of detailed description of these elements.

Power for operation is provided by a motor 2 which, through intermediate gearing and a one-revolution clutch arrangement generally indicated at 10 serves to drive a shaft 11 which serves as the main drive for various parts of the machine. Another shaft 32 is driven from the same mechanism through a gear 30, i.e., from the motor 2 through the clutch mechanism 10. A movable switch member 36 provides circuit closure through the motor 2 by engagement of contacts 38. Secured to the shaft 32 is a gear segment 48 subtending 180° and arranged to drive through half of a cycle of operation a pinion 50 secured to a shaft to which there is also secured a sprocket wheel 52 over which a chain 54 is retained to drive a second sprocket wheel 56 secured to a transverse shaft 58.

Figure 1:
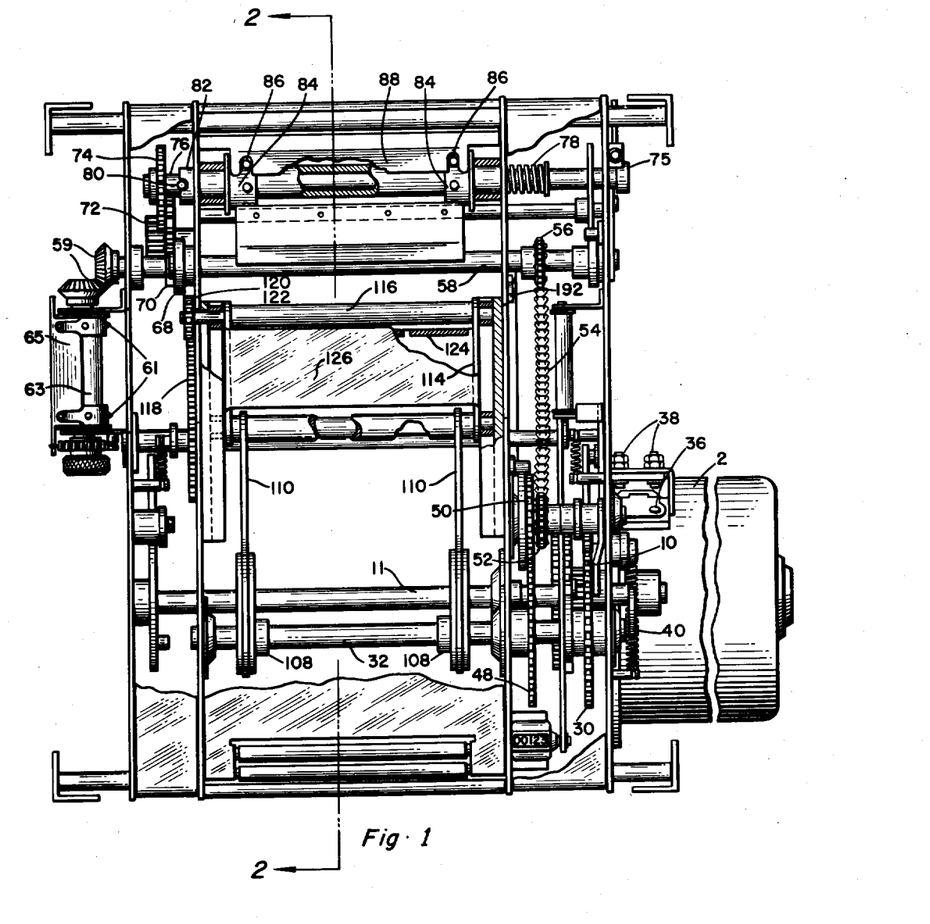
Figure 1 is a general plan view of the operating mechanism of a preferred type of machine, showing, in particular, the mechanism located below a top plate of the machine, with various parts broken away to show details of construction.

The elements already described are identical with those shown and described in my prior application (except for a relocation of elements from one side to the other of the machine) and the elements specifically mentioned are associated with others which are detailed in said prior application. In said prior application the shaft 58 is provided with a pair of pinwheels for the drive of a ticket strip in a direction from front to rear of the machine as viewed in the position of Figure 1. In the present machine, however, the ticket strip is driven transversely of the machine and for this purpose the shaft 58 drives through bevel gearing 59, a shaft 63 carrying pinwheels 61 engageable with openings in longitudinal end portions of the ticket strip. A stripping element 65 serves to maintain the edge portions of the ticket strip in engagement with the pinwheels 61, the edge portions having been removed from the central portion of the ticket strip as will be described hereafter.

Continuing the description of elements which are common to the present machine and that of said prior application, the shaft 58 carries a Geneva drive member 68 which cooperates with a driven member 70 to which is secured a pinion 72 meshing with a gear 74 secured to a second transverse shaft 76. The shaft 76 is longitudinally slidable and is urged toward the right, as viewed in Figure 1, by means of a spring 78 to engage a pin 80 carried by shaft 76 within a notch in the end of a sleeve 82. It will be noted that the pinion 72 is provided with a wide face so that the lengthwise movements of shaft 76 will not disengage the pinion 72 and gear 74. For the purpose of imparting movements to the shaft 76 toward the left, as viewed in Figure 1, to disengage pin 80 from sleeve 82 there is guided in the frame a pin engageable with a head 75 formed on the end of shaft 76. This arrangement permits manual axial movement of the shaft while preventing the projection through the housing of the rotating shaft. This arrangement thus prevents manual interference with the shaft rotation.

The sleeve 82 is provided with a pair of pinwheels 84 provided with pins 86 for the feed of a pair of record strips R and R' which are perforated at their edges. A member 88 serves to hold these strips in engagement with the pins and forms together with a plate 90 an outlet opening for the delivery at the rear of the machine of the record strip R. The matters last described have their exact counterparts in the machine of said prior application.

Figure 2:
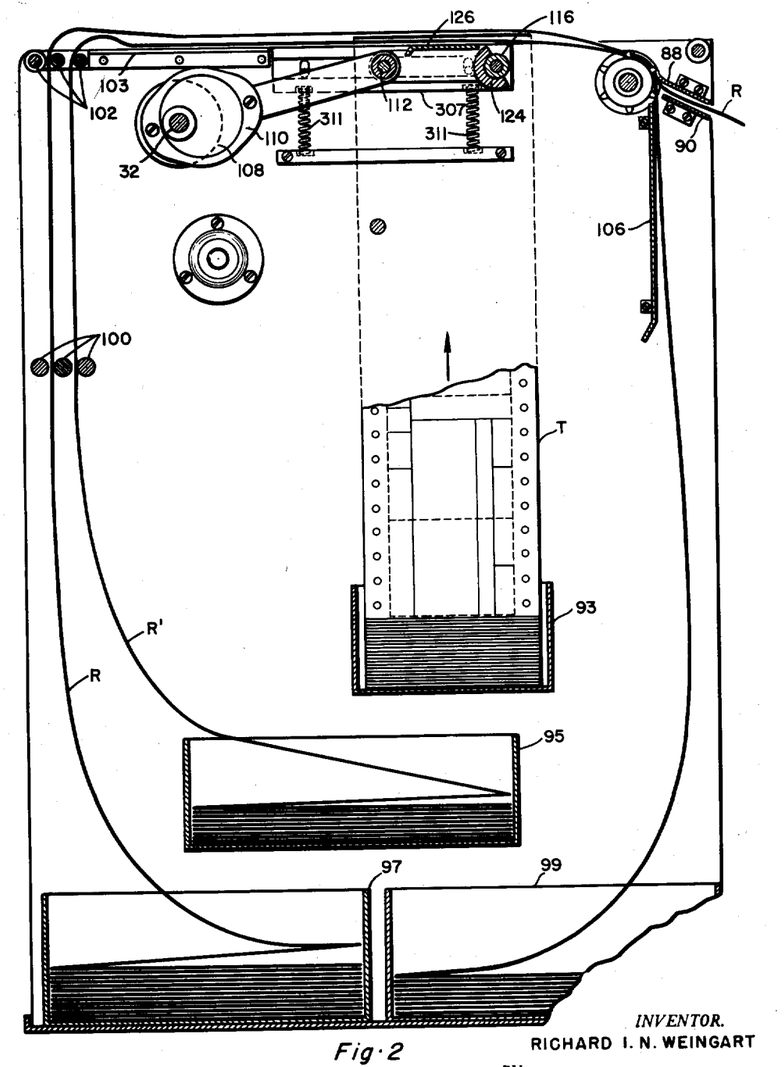
Figure 2 is a vertical section through the machine taken on the plane indicated at 2—2 in Figure 1 and particularly showing storage provisions within the machine.
Figure 3:
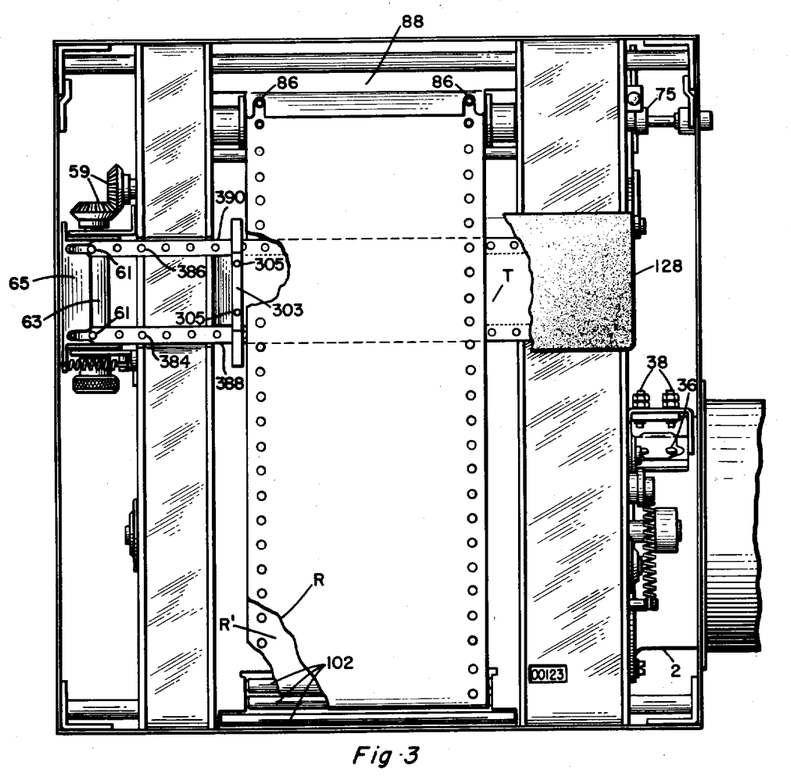
Figure 3 is a plan view of the machine with the top plate removed and various other parts broken away to show details.

The ticket strip T is provided from a bin 93 in the housing, as shown in Figure 2. Bins 95 and 97 supply the record strips R' and R which are fan-folded in the bins. The record strip R' is ultimately delivered to a receiving bin 99 wherein it is automatically refolded. To prevent interference of the several strips with each other, they are fed past spacing rollers 100 and 102 and over plate 103. A plate 106 serves to control and guide the movement of the record strip R' to the bin 99. It will be noted from Figure 2 that the ticket strip T passes between the record strips R and R'. Further discussion of this will appear hereafter.

Printing mechanism is provided in the same fashion as disclosed in said prior application. Secured to the shaft 32 are a pair of eccentrics 108 the straps 110 of which are pivoted at 112 to a carriage 114 which is mounted for horizontal sliding movements in the machine frame. A shaft 116 mounted in this carriage is provided with a pinion 118 which meshes with another pinion 120 carried by the carriage and which, in turn, meshes with a fixed rack 122 mounted on the machine frame. The shaft 116 carries a semi-circular platen 124 of yielding rubber material which serves to press the several strips against type to effect in each cycle a single printing operation. The carriage 114 is provided with a plate 126 which provides a backing for the writing of information on tickets. While the printing arrangement just described is desirable since it provides excellent impressions on multiple sheets, it will be evident that a flat printing platen might be provided to effect the printing operation in each cycle of operation of the machine.

As in said prior application printing elements are provided in a movable housing 128 which will be referred to hereafter as a printing box. This is provided with ears 130 which serve to mount it pivotally on the ends of shaft 58, this being merely a convenient mounting. The elements carried within the printing box 128 are arranged differently from those shown in my prior application in view of differences in details of the printing operations involved. The bottom of the printing box 128 is open and an arrangement is provided therein for the guidance and reception of an introduced slug S. Magnets, not shown, are provided as in said prior application to attract and hold upwardly a slug S inserted in the box. Various elements which need not be herein described are associated with the box and slug as described in my prior application, there being indicated at 144 an arcuate slotted link having the same function as the corresponding link described in my prior application.

A pair of rollers, one of which is indicated at 126, serve to mount the reeled ends of an inked ribbon C which, as compared with a generally coresponding ribbon in said prior application is of narrow width. Knobs such as 160 serve for control of movement of the ribbon C. While its movement could be made automatic in obvious fashion, this is unnecessary, the ribbon being advanced manually through manipulation of the knobs as required. The ribbon is guided about rollers 164 and 166 and also about guide strips 168 and 170 provided with slidable guide pins which are urged downwardly by springs, not shown. The members 168 and 170 serve for the guidance of a slug S by cooperating with guide slots in the box. In normal conditions prior to actual printing, the space above the ribbon C is greater than required for the reception of the slug and the slug is kept from engaging the ribbon C by means of magnets. However, as platen pressure is applied the members 168 and 170 are forced upwardly and serve to hold the slug in positive fashion and in definite position by reason of guide slots which receive projections on the slug. Located within the box are wheels 176 and 177 which carry date designations. If desired these may be changed through wheels accessible at the top of the box 128 and connecting gearing as described in my prior application. However they may be directly set by access beneath the box 128. As will appear, it is desirable in many instances to have either the same date repeated on tickets or to have two different dates printed on tickets, and two dating heads are provided for these purposes.

Figure 6:
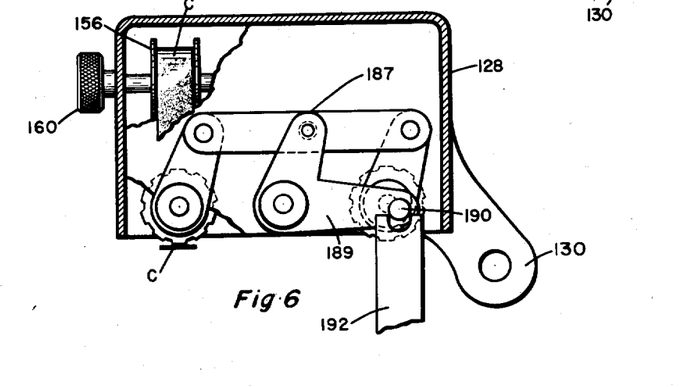
Figure 6 is a vertical section taken on the broken surface the trace of which is shown at 6—6 in Figure 5.

It is also desirable in many cases to have serial numbers of tickets duplicated on two coupons of an individual ticket or portion of a ticket, and for this purpose numbering heads 182 and 183 are provided arranged to be advanced concurrently. A third numbering head 185 is provided to be advanced concurrently with the other two in order to print serial numbers of tickets on the record strips. To achieve this result of advancing simultaneously the three numbering heads there is provided a linkage such as indicated at 187 in Figure 6 operated from a bell crank 189 provided with a pin 190 acted upon by the upper forked end of a link 192 in the fashion described in my prior application.

It will be evident that the printing box may contain other printing devices than those mentioned, including the slug S which will be referred to in greater detail. Such elements may include replaceable but generally fixed slugs carrying operator designations, machine number, signatures, or the like as described in my prior application.

As stated above, the controlling elements, detailed in said prior application, are actually involved in the present machine but are not detailed herein since they may be identical with those of said prior application. Such elements include those involved in securing a single cycle of operation upon lowering of the box 128, with interlocking devices, etc., for insuring proper operation and avoidance of fraud.

Figure 4:
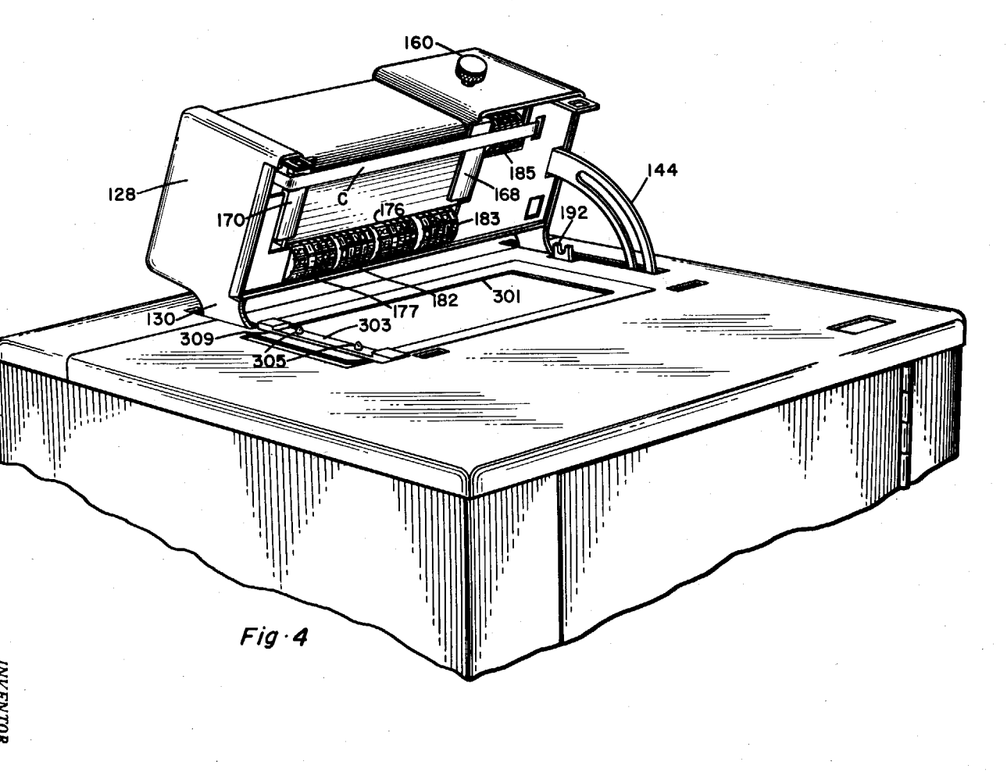
Figure 4 is a perspective view of the upper portion of the machine particularly showing the printing box in opened position for write-in purposes.
Figure 5:
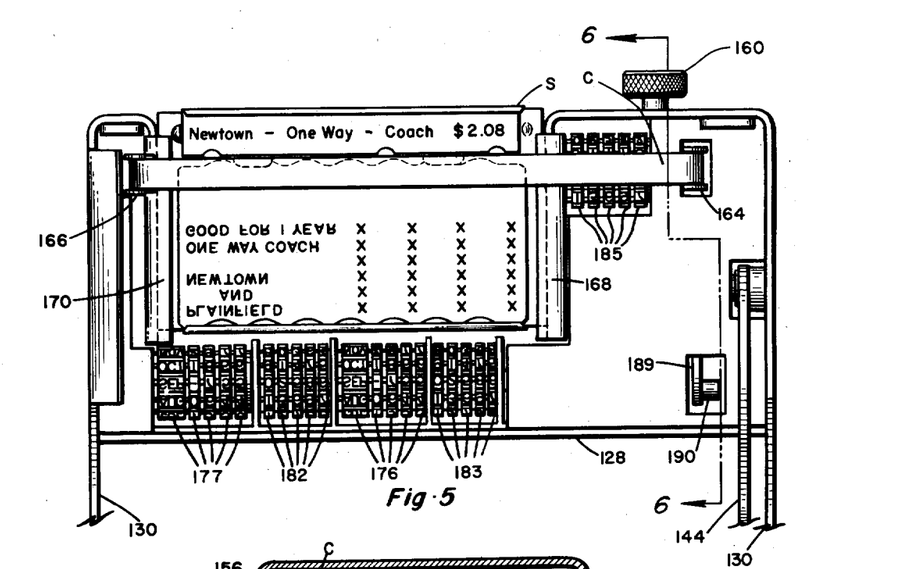
Figure 5 is an inverted plan view of the printing box.
Figure 8:
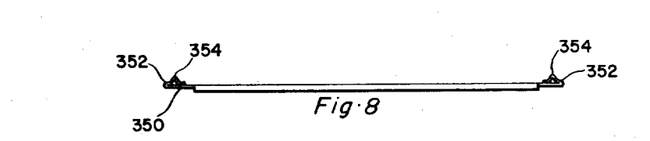
Figure 8 is a front elevation of the slug.
Figure 9:
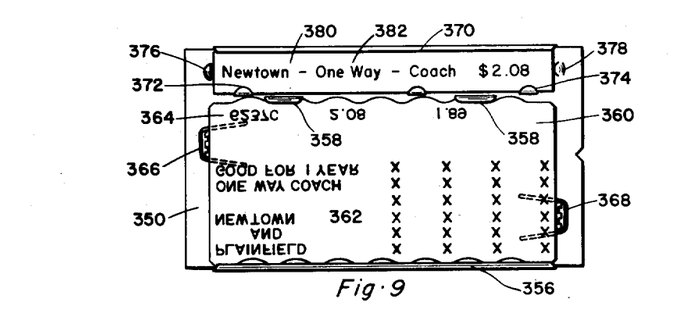
Figure 9 is a bottom plan view of the slug.
Figure 10:
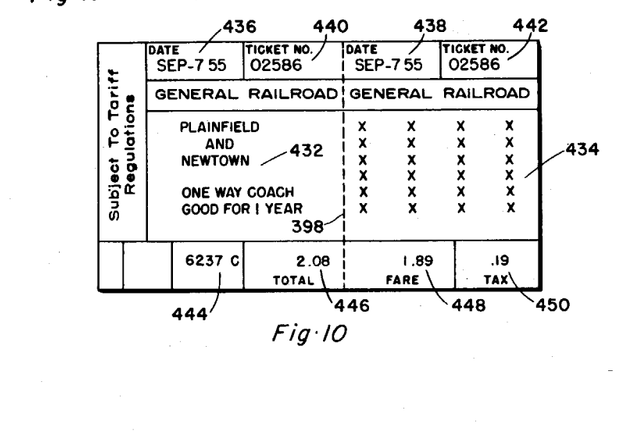
Figure 10 is a plan view of a ticket such as may be issued utilizing the slug shown in Figure 9.

As indicated in Figure 4 the area of the top of the machine below the box 128 is provided with an opening terminated by a border element 301 wherein there is exposure of the uppermost record strip R. A border 303 is provided with pins 305 for the proper location of ticket blanks such as will be hereafter described. A plate 309 serves to provide the upper edge of an opening through which the ticket strip is projected during operation, and to provide for proper tearing there is located below this a plate 307 urged upwardly by springs 311. Reference may now be made particularly to a typical slug such as illustrated in Figures 8, 9 and 10. This slug comprises a body 350 of steel having its side edges folded at 352 and shaped to provide ridges 354 presenting angular edges arranged to seat in the bottoms of the guide grooves in the box. As a result of this construction, when the strips 168 and 170 are raised and upward pressure is applied to the slug it is precisely and fixedly positioned in the printing box.

The lowered edge of the body as viewed in Figure 9 is inturned at 356 and cooperates with punched out tabs 358 to hold the printing matrix 360 which is held at its sides by lugs 366 and 368 punched outwardly from the slug body. The matrix, which is of the inexpensive type commonly used in addressing machines, has type elements therein of two groups, the first, 362, arranged to print matters on tickets only and the latter, 364, arranged to print matters on the record or journal strips and, in some cases, on tickets. The type elements 364 on the matrices are aligned with the active type on the numbering head 185.

The upper edge 370 of the body of the slug is inturned and cooperates with punched out tabs 372 and 374 and with punched out lugs 376 and 378 to hold a slug identifying label 380 on which may be printed data 382 corresponding to the matrix, including, for ready reference by the ticket agent, the price to be charged for the ticket issued through use of the slug. A large number of these slugs may be stored in a rack in overlapping arrangement with their identifying labels 380 exposed to view.

Figure 7:
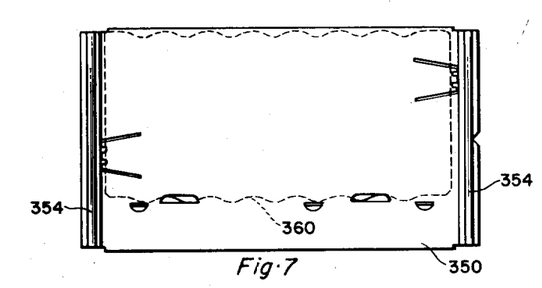
Figure 7 is a top plan view of a typical slug provided for use in the machine.

X's as indicated in Figure 9 may be provided to fill space on a ticket which should not receive insertions. They serve the further purpose of providing even pressure to maintain the slug in proper printing position when the useful matter to be printed is asymmetrically located on the slug as in the particular slug illustrated in Figures 7 to 9.

The operations involved may be best made clear by considering first the issuance of a simple one-way transportation ticket, with reference to Figures 5, 9, 10, 11 and 12.

Figure 11:
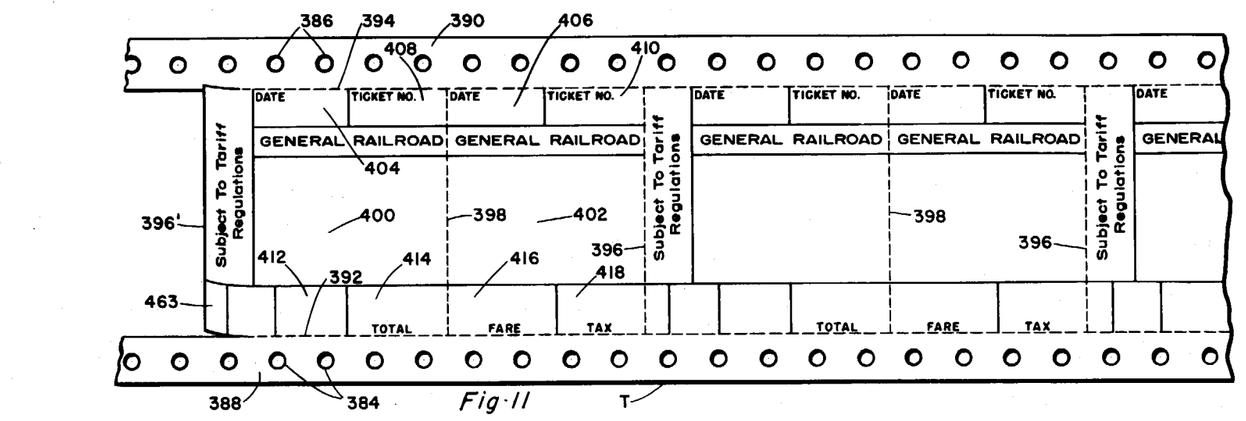
Figure 11 is a fragmentary view of the ticket strip used in the machine, there being indicated at the left thereof the fashion in which the feeding edge portions of the strip are separated from the central portion thereof.

The ticket strip T shown in Figure 11, and illustrated in position in the machine in Figure 2, is provided with feeding perforations 384 and 386 in its longitudinal edge portions 388 and 390 which are differentiated from the central body of the ticket strip by lines of perforations 392 and 394. The central portion of the strip is provided with ticket-separating perforations 396 which extend transversely between the lines of perforations 392 and 394. The severed end of a leading ticket is indicated at 396', this resulting from tearing along one of the transverse lines of perforations 396. A central line of perforations 398 may be provided across each ticket for utilization when the ticket is to be separated, under some conditions, into two portions. The strip may be concurrently preprinted with standard indications such as of the carrier involved, reference to tariff regulations, or the like, as well as to provide convenient boxes identifying items which are printed by the machine. For example, in the case of the strip illustrated in Figure 11, areas 400 and 402 may be delimited for the printing of various matters by a slug, such matters, for example, being descriptive of the type of ticket and giving origin and destination stations. Boxes 404 and 406 are provided within which a date may be printed, in duplicate or otherwise. Boxes 408 and 410 may be provided for the duplicate printing of each ticket number. A box 412 may be provided for the printing of a code designation of the ticket issued, while boxes 414, 416 and 418 may be provided for the printing of a total fare, net fare and tax. As will be clear from what follows, the ticket strip T may be otherwise printed depending upon the particular use of the machine, and what is illustrated in Figure 11 is to be considered merely a general example of the form which this strip may take.

The journal strip R' previously mentioned is provided with feeding perforations 420 and 422 at its edges and may or may not be preprinted as desired. The other record or journal strip R is likewise provided with feeding openings 424 and 426 at its edges, and may or may not be preprinted as desired.

Figure 12:
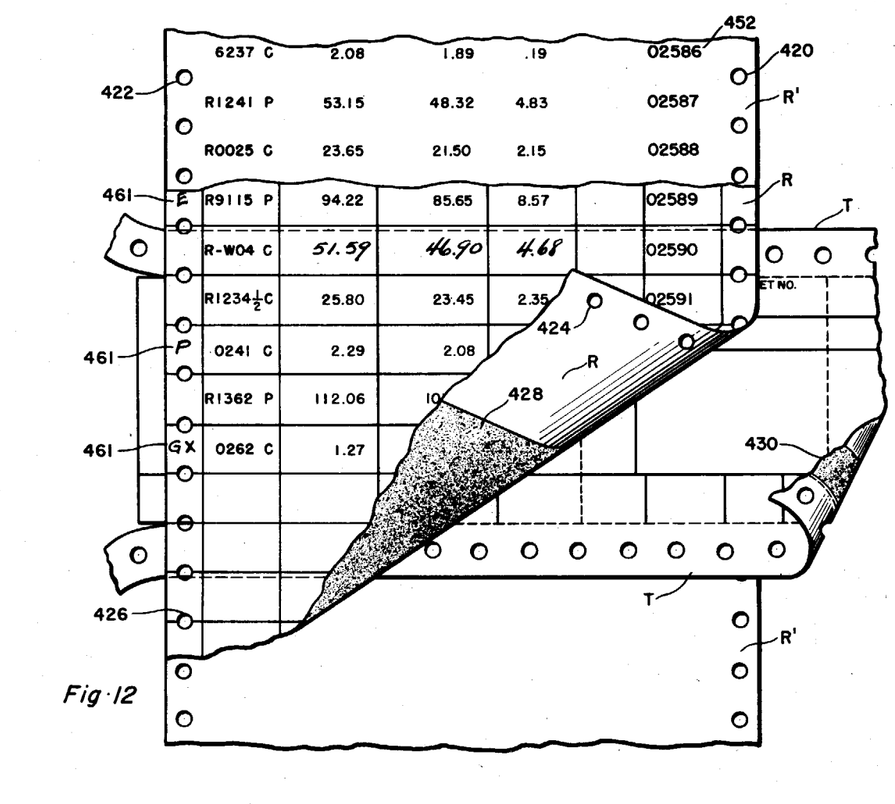
Figure 12 is a fragmentary plan view showing the fashion in which various strips are associated in the machine.

As illustrated in Figure 12 and also in Figure 2, the journal strip R' is lowermost and the ticket strip T is arranged to move above it in a transverse direction. The strip R is uppermost and moves concurrently with the strip R'. If carbon reproduction is used, the ribbon C is arranged to provide impressions on the uppermost record strip R. This strip R is desirably provided on its underside with a carbon coating 428 over only a part of its area for a purpose which will hereafter become apparent. The ticket strip is provided on its underside with a lengthwise extending carbon strip area 430 corresponding to the line of the boxes 412, 414, and 416, thus providing a limited transverse area in which printing may be effected on the lowermost strip R'.

A typical one-way ticket issued through the use of the slug shown in Figure 9 is illustrated in Figure 10. As will be evident from comparing Figures 9 and 10, the matter indicated at 432 relating to destination and origin and other matters is printed by the slug in the ticket strip area 400, while in the case of this ticket the area 402 is imprinted with X's as illustrated at 434, these X's serving the dual purpose of preventing tilting of the slug and smudging of the ticket during the printing operation and also serving to cover the area 402 to an extent preventing false printing or writing of other matter thereon. The slug also prints at 444 the code designation of the ticket and the fare data at 446, 448 and 450. The data is printed in duplicate at 436 and 438 by the dating heads 177 and 176. The number of the ticket is printed in duplicate at 440 and 442 by the numbering heads 182 and 183. In the case of a one-way ticket the duplicate printings of date and number are not of special significance, but duplicate printing is provided so that in other cases, as in the issuance of round trip tickets, the date and ticket number will appear on each coupon of the ticket, the ticket being then severed by tearing along the central line of perforations 398.

When printing of the ticket occurs as just described, printing is also effected through the utilization of the carbon strip C on the uppermost record strip R, and a duplicate of this printing is effected also on the lowermost record strip R' through the carbon strip 430 on the bottom of the ticket strip T. Not only are there thus printed the matters which are printed in the boxes 412, 414, 416 and 418 of the ticket, but additionally the number of the ticket is printed by the numbering head 185. This numbering head, however, does not print on the ticket strip by reason of the fact that the carbon backing 428 on the strip R is limited in extent and does not extend beneath the numbering head 185. The uppermost line of printing illustrated at 452 in Figure 12 is that which is printed on the record strips in the issuance of the ticket shown in Figure 10. The mechanical operation of the machine in effecting the foregoing will be clear from the description of the operation given above in connection with the description of operation given in my prior application. Briefly stated, the operation involves an insertion of the desired slug into the printing box and the box is then pressed downwardly initiating the automatic cycle of operation which involves printing through the movement of the platen 124 in rolling fashion under the action of eccentrics 108 to press the record and ticket strips together and against the lower surface of slug and the date printing and numbering heads. A single printing action occurs in each cycle, and following this the ticket strip is advanced a ticket length by the pinwheels 61 while the record strips are advanced to the extent of the spacing of adjacent perforations by the pinwheels 84 and 86. In this advancing operation the record strip R is correspondingly projected from the machine while the record strip R' is advanced toward the receptacle 99 in which it is retained. In the advance of the ticket strip the edge portions are torn off by the action of the stripper element 65, tearing taking place along the lines of perforations 392 and 394. After the trailing end of the printed ticket is brought into alignment with the lip 309 the operator may tear off the ticket along the line 396 of perforations. The machine automatically comes to rest with the printing box in partially raised position so that the slug may be removed and the box is ready for insertion of another slug.

Figure 13:
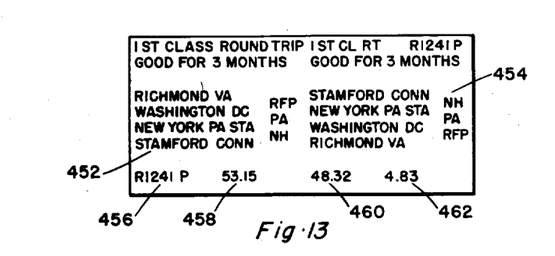
Figure 13 is a view showing the total matter printed by a slug provided for the issuance of a typical interline multiple coupon round-trip ticket.

The issuance of a single, two coupon round trip ticket is mechanically identical with the foregoing, there being only changes in the matter printed by the slug as illustrated in Figure 13 which shows matters typically printed. In this case the orders of stations indicated at 452 and 454 are printed respectively in the areas 400 and 402 together with other corresponding, partially duplicate data as illustrated at the top of Figure 13. The code designation of the ticket is printed as at 456 and the fare data at 458, 460 and 462. These data are printed on the record strips as well as the ticket number as previously described. The date and the ticket number are each printed in duplicate on the ticket and in this case these are carried by the respective portions of the ticket on opposite sides of the line of perforations 398.

Another type of operation involves the printing of a write-in ticket. In this case, one of a suitable group of write-in slugs may be utilized, these slugs, for example, identifying merely the general type of ticket to be issued such as a one-way ticket, a round trip ticket, or the like, the slug not being identified with particular origins or destinations or carrying price data. In issuing such a ticket the printing box is raised to an uppermost position and the price data is written on the upper record strip R as indicated in the fifth line from the top in Figure 12.

The plate 126 forms a backing for this writing which occurs on both record strips and on the ticket in the boxes 414, 416 and 418. The write-in slug is then inserted and the machine operated in usual fashion. This effects printing on the ticket of the code designation of the slug used, the date and serial number and such general matter as may be contained on the slug for example, an indication that it is a one-way or round trip ticket or the like. Following the issuance of the ticket it is then removed from the machine and there may be written on it the origin and destination. The rules of the carrier may require that in writing these later matters on the ticket a duplicate carbon slip must be made to be turned in by the seller. Alternatively, the seller may be required to place a sheet over the upper record strip R, this sheet being provided with perforations for alignment over the pins 305 and being preprinted with areas for the guidance of the issuing agent in writing in the necessary data. Such a slip may be provided with a carbon backing over the area which is aligned with the areas 412, 414, 416 and 418 so as to reproduce on the record strip R the fare data and so as to effect printing of the code designation of the slug and the ticket number on the record strip R, the slug also printing these matters on the slip. The slip will then serve as a record of the transaction.

Even when there is issued a ticket such as shown in Figure 10 having fare data and designations printed by a slug, occasions may arise making desirable some writing-in of special matters, and this may be accomplished in the fashion just described, such matters being indicated at 461 in Figure 12. These matters would appear on a ticket in a block 463, Figure 11.

In the reference to Figure 13, above, the assumption was made that only a single ticket would be issued for a round trip involving the data shown in Figure 13. In Figure 13 the data is essentially interline, and what has been described would more aptly apply to a round trip on a single line, though a single ticket might be issued for the interline trip to which Figure 13 corresponds. More generally, in connection with an interline ticket it would be desirable to provide separate ticket coupons which could be lifted by conductors for the various lines or, as is customary in connection with airline travel, at the point of embarkation on each plane. There will now be described, again with reference to Figure 13, the issuance of a combination ticket involving six coupons each corresponding to one of the partial trips indicated in Figure 13.

Figure 14:
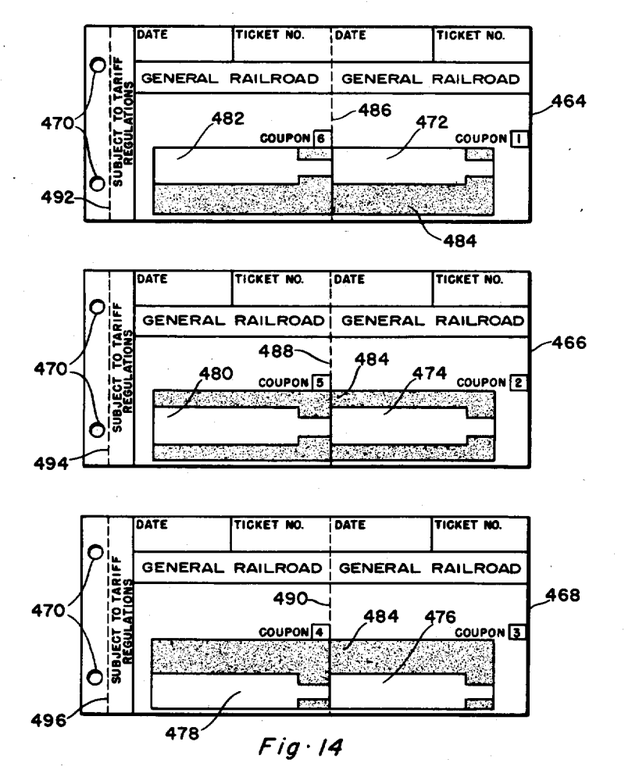
Figure 14 illustrates three sheets arranged to be associated for the printing of a multiple coupon ticket by a slug such as will print the matter shown in Figure 13.
Figure 15:
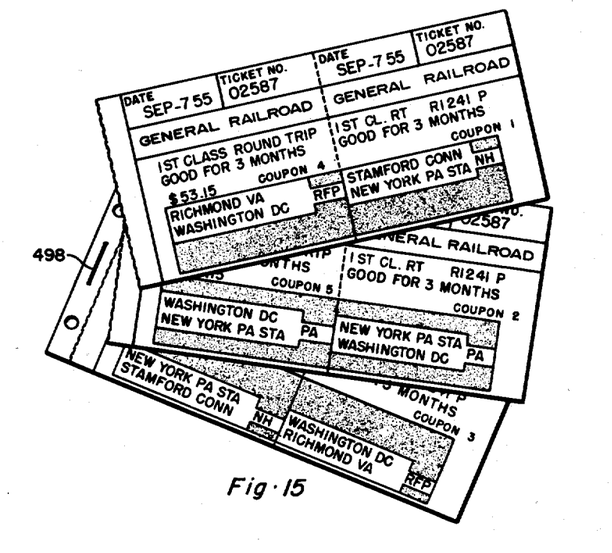
Figure 15 is a plan view showing the several sheets of a completed ticket formed from the sheets shown in Figure 14 and printed by a slug capable of printing the matter shown in Figure 13.

For this purpose there may be provided a book of ticket slips comprising the superimposed leaves 464, 466 and 468. These leaves may be preprinted as indicated in Figure 14 with areas 472, 474, 476, 478, 480 and 482 for the imprinting of pairs of stations representing the partial trips, other areas such as indicated at 484 being blacked out so that even though printing occurs thereon it will not be clearly discernible. Each of the leaves is provided with a line of perforations such as indicated at 486, 488 and 490. Each of the leaves is provided with a pair of openings 470 for alignment on the pins 305, and they are provided with lines of perforations 492, 494 and 496 along which tearing of the last three coupons may take place after the end portions are stapled together to form a booklet as indicated at 498. The leaves 464 and 466 may be provided with carbon backing throughout the areas of printing while the leaf 468 may have a back surface which does not carry carbon. A carbon-backed sheet (not shown) may be superimposed on the leaf 464 for the printing of the matter thereon. It will be evident that the type matter illustrated in Figure 13 will thus produce a composite ticket of six coupons and three leaves as indicated in Figure 15. In the printing operation the top and bottom record sheets will be printed as before, while the ticket strip T will be printed but in this case will not provide a valid ticket but only a voucher to be retained by the selling agent. It will be noted that the price data is not printed on the ticket leaves, though if desired this, of course, may be accomplished in which case the lowermost ticket leaf would be provided with a carbon backing strip for the printing of the uppermost record sheet R.

It may be noted that the mechanism is such as to print properly varying thicknesses of piles of sheets including the ticket strip, record strips and assemblies superimposed on the top record strip, the printing operation being progressive so that, as in the case of the issuance of the "book" of Figure 15 the thickness presented may vary in the printing operation, only three sheets being involved in the printing of the fare data while six are involved in the printing of the data on the leaves of the "book."

Preferably, however, printing is effected as described since otherwise the thickness of the "book" might prevent a good impression on the strips R and R'. The printing on the ticket strip T may be poor, but on the voucher provided from it this will be immaterial since the code designation and price data will be printed normally without interference by the thickness of the book.

In the foregoing description reference has been made to the use of carbon sheets in the printing operations. It will be evident, however, that there may equally well be used "chemical" printing of known type in which the sheets have adjacent surfaces impregnated so as to effect printing on the application of sufficient pressure, or of the type in which each sheet is treated in known fashion so that upon the application of pressure printing will appear thereon. From what has been described it will be evident to those skilled in the art how such impregnation or other treatment may be localized to effect selective printing of various areas without printing of others to which type pressure may also be applied during a printing operation. It will be evident that a wide range of choice in printing is available without modification of the basic aspects of the machine.

Figure 16:
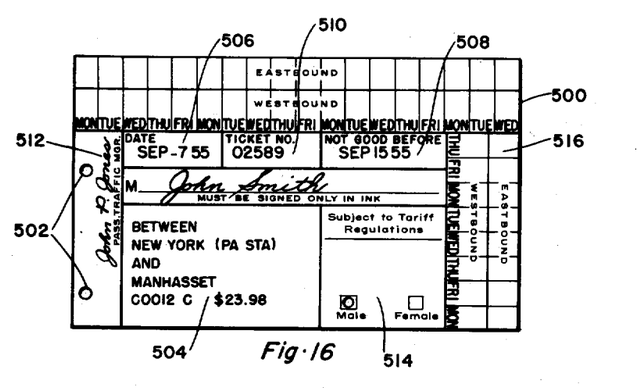
Figure 16 shows a typical commutation ticket such as may be issued through the use of the machine.

Another example of the capabilities of the machine is in the issuance of commutation tickets of the type illustrated in Figure 16. In this type of ticket extra area must be provided for punching in the use of the ticket. A typical ticket which may be provided is indicated generally at 500 and is provided with a pair of openings 502 for reception of the pins 305 to align the ticket 500 above the upper record strip R. The slug in this case prints the matter indicated at 504 including not only the stations involved but also the ticket code and total price, the slug additionally carrying in the same fashion as previously described a line including the code designation and the price data for printing only on the record strips and the strip T, this last matter of the slug not being printed on the ticket 500, that ticket terminating short of the position of the last mentioned type.

In the printing of the ticket 500 it may be desirable to have printed the date of issuance and a subsequent date prior to which the ticket may not be valid or subsequent to which the ticket may not be valid. Accordingly the two dating heads 277 and 276 are set differently to provide the printing indicated at 506 and 508.

For the printing of the matter on the ticket 500 the ticket as originally provided for insertion in the machine may carry on its upper face a carbon backed sheet (not shown) which provides carbon only over a limited area with the result that the data at 504 will be printed together with the dates at 506 and 508 and the ticket number at 510 without, however, printing the ticket number in the region 516 which may form part of the area arranged to be punched. Likewise the area 514 may be left clear even though the slug may be provided with X's in this area. Provision may be made to validate the ticket by the printing in the machine of a signature such as indicated at 512, the printing of which may be effected through the provision for reception of a removable separate slug in the printing box. The other matter such as shown on ticket 500 will be preprinted thereon. If the material of the ticket 500 is relatively heavy, as is usually the case in commutation tickets, the portion of the ticket strip lying beneath it may receive no impression or a poor one. However, the lower line of type on the slug will print the code designation and the price data on the strip T as well as on the journal or record strips R and R', such printing taking place below the lower edge of the ticket 500. Clear impressions will thus be made on the record strips and on the strip T, the issued portion of which will provide a voucher.

It may be noted that the fact that the ticket strip T is located below the record strip R so as not to be accessible to the ticket issuing agent serves to minimize the possibility of fraudulent issuance of tickets since whatever is printed by a slug in the machine will be reproduced on the strip T whether the area printed becomes a ticket or only a voucher.

In comparison with the tickets printed by the machine of my prior application referred to above, smaller size tickets may be issued in the present machine as is usually desirable, consistent with the reproduction of full data on the journal strips.

While the description has been primarily directed to the issuance of transportation tickets, it will be obvious that the machine may be used for other purposes involving stock control, sales of merchandise, or the like. In such cases various items of merchandise may be represented by suitable slugs so that upon withdrawal from stock tickets are printed for control purposes while at the same time tabulation records are provided on sheets such as R and R'. While two single sheets of this type have been described, it will be obvious that either or both may be provided in duplicate fashion depending upon the desires of the machine user.

In the foregoing description it has been assumed that the various printed sheets are thin so that impressions may be transmitted through a superimposed stack thereof. One other possibility is offered by the machine with slight variation to provide for the printing of tickets or the like on heavier cardboard material through which impressions cannot satisfactorily be made. In such case provision may be made for the insertion of a cardboard ticket blank in position below the uppermost record strip R and above the position of the lowermost record strip R', the strip corresponding to T not being then used, or if used, being located above the cardboard blank. If the cardboard blank is then of dimensions such as not to be aligned with the lowermost line of type on the slug, i.e., the line containing the code designation and the price data, the cardboard blank will be printed by the major portion of the slug while the line of type just referred to will print the record strips in the fashion previously described. Such an arrangement may be used, for example, where it is desired to print a commutation ticket, which, by reason of its expected use, may desirably be of heavy stock.

What is claimed is:

1. A form issuing machine comprising means for guiding and advancing a sheet member, means for guiding and advancing a record strip in a direction transverse to the direction of advance of said member and in close flatwise proximity thereto, means for positioning a type face in printing relationship with said member and said strip, means for effecting simultaneous printing of both said member and said strip by a positioned type face with printing by said type face of a substantially greater area of said member than of said record strip and with printing by a portion of said type face of both said member and said record strip, and means controlling a cycle of operation of said machine to effect such simultaneous printing by a positioned type face and predetermined advances of both said member and said strip, with advance of said record strip less than the advance of said member.

2. A form issuing machine comprising means for guiding and advancing a sheet member, means for guiding and advancing a record strip in a direction transverse to the direction of advance of said member and in close flatwise proximity thereto, means for positioning a type face in printing relationship with said member and said strip with said strip positioned between said type face and said member, means for effecting simultaneous printing of both said member and said strip by a positioned type face with printing by said type face of a substantially greater area of said member than of said record strip and with printing by a portion of said type face of both said member and said record strip, and means controlling a cycle of operation of said machine to effect such simultaneous printing by a positioned type face and predetermined advances of both said member and said strip, with advance of said record strip less than the advance of said member.

3. A form issuing machine comprising means for guiding and advancing a sheet member, means for guiding and advancing a pair of record strips in a direction transverse to the direction of advance of said member on opposite sides of said member and in close flatwise proximity thereto, means for positioning a type face in printing relationship with said member and said strips, means for effecting simultaneous printing of both said member and said strips by a positioned type face with printing by a portion of said type face of both said member and said record strips, and means controlling a cycle of operation of said machine to effect such simultaneous printing by a positioned type face and predetermined advances of both said member and said strips, with advance of said record strips less than the advance of said member.

4. A form issuing machine comprising means for guiding and advancing a sheet member, means for guiding and advancing a pair of record strips in a direction transverse to the direction of advance of said member on opposite sides of said member and in close flatwise proximity thereto, means for positioning a type face in printing relationship with said member and said strips, means for effecting simultaneous printing of both said member and said strips by a positioned type face with printing by said type face of a substantially greater area of said member than of said record strips and with printing by a portion of said type face of both said member and said record strips, and means controlling a cycle of operation of said machine to effect such simultaneous printing by a positioned type face and predetermined advances of both said member and said strips, with advance of said record strips less than the advance of said member.

5. A form issuing machine comprising means establishing a printing area, means for positioning a type face above and in printing relationship to said printing area, means providing a backing element below said printing area, said positioning means being movable to a position to clear the space above said printing area thereby to permit manual writing on sheet material located in said printing area and backed by said backing element, means for guiding and advancing a sheet member across said printing area at a level above said backing element, means for guiding and advancing a record strip across said printing area at a level above said backing element in a direction transverse to the direction of advance of said member and in close flatwise proximity thereto, and means for effecting simultaneous printing in said printing area of both said member and said strip by a positioned type face with printing by a portion of said type face of both said member and said record strip.

6. A form issuing machine comprising means establishing a printing area, means for positioning a type face above and in printing relationship to said printing area, means providing a backing element below said printing area, said positioning means being movable to a position to clear the space above said printing area thereby to permit manual writing on sheet material located in said printing area and backed by said backing element, means for guiding and advancing a sheet member across said printing area at a level above said backing element, means for guiding and advancing a record strip across said printing area at a level above said sheet member in a direction transverse to the direction of advance of said member and in close flatwise proximity thereto, and means for effecting simultaneous printing in said printing area of both said member and said strip by a positioned type face with printing by a portion of said type face of both said member and said record strip.

7. A form issuing machine comprising means establishing a printing area, means for positioning a type face above and in printing relationship to said printing area, means providing a backing element below said printing area, said positioning means being movable to a position to clear the space above said printing area thereby to permit manual writing on sheet material located in said printing area and backed by said backing element, means for guiding and advancing a sheet member across said printing area at a level above said backing element, means for guiding and advancing a pair of record strips across said printing area respectively above and below said sheet member at levels above said backing element in a direction transverse to the direction of advance of said member and in close flatwise proximity thereto, and means for effecting simultaneous printing in said printing area of said member and both of said strips by a positioned type face with printing by a portion of said type face of said member and both of said strips.

8. A form issuing machine according to claim 5 including means controlling a cycle of operation of said machine to effect such simultaneous printing by a positioned type face and predetermined advances of both said member and said strip, with advance of said record strip less than the advance of said member.

9. A form issuing machine according to claim 6 including means controlling a cycle of operation of said machine to effect such simultaneous printing by a positioned type face and predetermined advances of both said member and said strip, with advance of said record strip less than the advance of said member.

10. A form issuing machine according to claim 7 including means controlling a cycle of operation of said machine to effect such simultaneous printing by a positioned type face and predetermined advances of both said member and said strips, with advance of said record strips less than the advance of said member.

References Cited in the file of this patent

UNITED STATES PATENTS

| | | |
|---|---|---|
| 1,037,463 | Freeman et al. | Sept. 3, 1912 |
| 1,056,765 | Ohmer | Mar. 18, 1913 |
| 1,117,179 | Fuller | Nov. 17, 1914 |
| 1,169,590 | Zullin | Jan. 25, 1916 |
| 1,595,519 | Hubbard | Aug. 10, 1926 |
| 1,832,007 | Eckland et al. | Nov. 17, 1931 |
| 2,035,095 | Racz | Mar. 24, 1936 |
| 2,160,539 | Clark | May 30, 1939 |
| 2,601,283 | Helsel | June 24, 1952 |
| 2,609,746 | Helsel | Sept. 9, 1952 |